United States Patent
Simons

Patent Number: 5,913,558
Date of Patent: Jun. 22, 1999

[54] WINDSHIELD WIPER POSITIONING TOOL

[75] Inventor: Wayne K. Simons, Kent, Wash.

[73] Assignee: Paccar Inc., Bellevue, Wash.

[21] Appl. No.: 08/943,390

[22] Filed: Oct. 3, 1997

[51] Int. Cl.⁶ ................................. A47L 1/06; B25J 1/04
[52] U.S. Cl. .......................... 294/24; 294/19.1; 15/105; 15/121
[58] Field of Search .............................. 294/19.1, 24, 26; 15/105, 117, 121, 236.02, 245

[56] References Cited

U.S. PATENT DOCUMENTS

| | | | |
|---|---|---|---|
| 625,628 | 5/1899 | Wray | 15/117 |
| 1,339,257 | 5/1920 | Callahan | 294/26 |
| 2,597,400 | 5/1952 | Stogsdill et al. | 294/26 |
| 2,674,794 | 4/1954 | Baker | 15/105 |
| 2,739,330 | 3/1956 | Hitchcock | 294/24 |
| 3,463,533 | 8/1969 | Repiscak et al. | 294/26 |
| 4,107,812 | 8/1978 | Lantto | 15/245 |
| 4,392,269 | 7/1983 | Nishiyama et al. | 15/145 |
| 4,624,494 | 11/1986 | Huppert | 294/26 |
| 4,928,341 | 5/1990 | Pacione | 15/105 |
| 5,255,405 | 10/1993 | Samuelsson et al. | 15/144.1 |
| 5,338,128 | 8/1994 | Blanco | 403/206 |
| 5,344,201 | 9/1994 | Offin | 294/24 |
| 5,713,617 | 2/1998 | Marinaro | 294/24 |
| 5,729,854 | 3/1998 | Powers | 294/24 |

*Primary Examiner*—Dean Kramer
*Attorney, Agent, or Firm*—Seed & Berry LLP

[57] ABSTRACT

A positioning tool for positioning the windshield wiper of a vehicle. The tool includes an engaging member which has at least one bend and extends at least partially around a retaining region. A user engages the windshield wiper with the engaging member and positions the wiper in the retaining region to move the wiper toward or away from the windshield. The tool has a handle which may be gripped by the user and which has a length sufficient to allow the user to stand on the ground beside the vehicle while positioning the windshield wiper relative to the windshield of the vehicle.

35 Claims, 4 Drawing Sheets

WINDSHIELD WIPER POSITIONING TOOL

TECHNICAL FIELD

The present invention is directed toward a tool for positioning a windshield wiper of a vehicle.

BACKGROUND OF THE INVENTION

Operators of vehicles such as cars and trucks must periodically clean the windshields of the vehicles to maintain clear visibility of the road, road signs, other vehicles and other obstructions and hazards. Operators typically clean the windshield by scrubbing the windshield with a wetted sponge, and then removing loosened debris from the windshield with a squeegee or similar device.

Vehicles typically have windshield wipers positioned against the windshield which may interfere with the operators' efforts to clean an area of the windshield proximate to the wipers. Therefore, windshield wipers are typically mounted to the vehicle so that they can be pivoted toward and away from the windshield. A spring with an overcenter device tends to force the wiper either against the windshield during normal operation or away from the windshield when the windshield is cleaned.

On large vehicles such as trucks, the windshield and windshield wipers are located a significant distance above the ground and are therefore difficult for the operator to reach and move. One method the operator has for reaching the wipers is to climb onto the cab of the truck. A drawback of this method is that the operator may damage the truck by scratching or denting the cab exterior, or by jarring components proximate to the cab, such as exhaust stacks and air intakes.

Alternatively, the operator may try to clean around the windshield wipers. One drawback of this method is that the operator must exercise additional care so as not to damage the windshield wipers. Another drawback is that the operator leaves an uncleaned portion of the windshield in the vicinity of the wipers. Visibility through the uncleaned portion of the windshield may be reduced and may therefore create a safety hazard.

SUMMARY OF THE INVENTION

In brief, the present invention provides a tool for positioning a windshield wiper of a vehicle. The tool may be used to move the windshield wiper away from the windshield prior to cleaning the windshield and toward the windshield subsequent to cleaning. The tool may be fixedly or removably attached to a handle and may be retrofitted to existing handles or cleaning devices.

In one embodiment, the tool comprises a substantially rigid engaging member which has a first portion configured to releasably engage a portion of the windshield wiper. A user engages the first portion of the tool with the portion of the windshield wiper and by moving the tool, positions the windshield wiper. A second portion of the tool, adjacent the first portion, extends away from the first portion and is configured to be attached to a handle.

In a further aspect of this embodiment, the first portion is bent back upon itself to form a retaining region within which the portion of the windshield wiper is retained. In another embodiment, the first portion is at least partially wound about a longitudinal axis extending away from the second portion.

In a further embodiment, the engaging member is attached to one end of a handle. An opposing end of the handle is adapted to be gripped by a user and allows the user to position the windshield wiper with the engaging portion by moving the handle while the user remains standing on the ground beside the vehicle. In yet a further embodiment, the tool includes a cleaning device, such as a sponge or a squeegee, allowing the user to clean the windshield without requiring an additional tool.

DETAILED DESCRIPTION OF THE INVENTION

Figure 1:
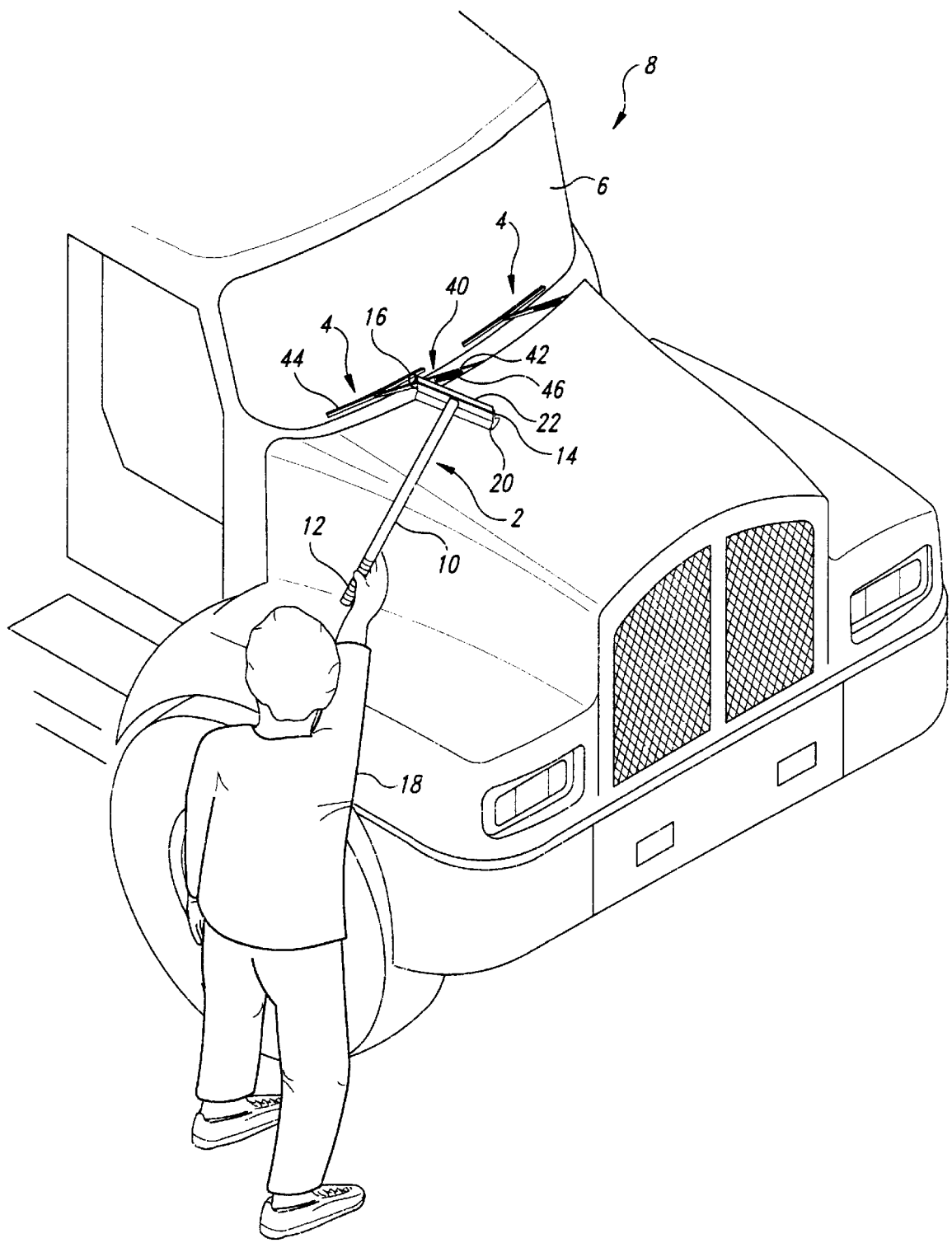
FIG. 1 is an isometric view of a user operating a windshield wiper positioning tool in accordance with an embodiment of the invention to move a windshield wiper of a truck.

As discussed above, the present invention is directed toward a tool for positioning the windshield wiper of a vehicle, such as a truck. In the embodiments illustrated herein, a positioning tool 2 is used to move a windshield wiper 4 toward or away from a windshield 6 of a truck 8, as seen in FIG. 1. The positioning tool 2 includes a handle 10 elongated along a handle axis and having a handgrip 12 at one end and a mounting bracket 14 at an opposing end. An engaging member or hook 16 is mounted to one end of the mounting bracket 14. A sponge 20 and squeegee blade 22 are attached to opposing surfaces of the mounting bracket 14. A user 18 engages the engaging member 16 with the windshield wiper 4 to move the windshield wiper away from the windshield 6. The user 18 may then use the sponge 20 and squeegee blade 22 to clean the windshield once the windshield wiper 4 has been moved out of the way.

Figure 2:
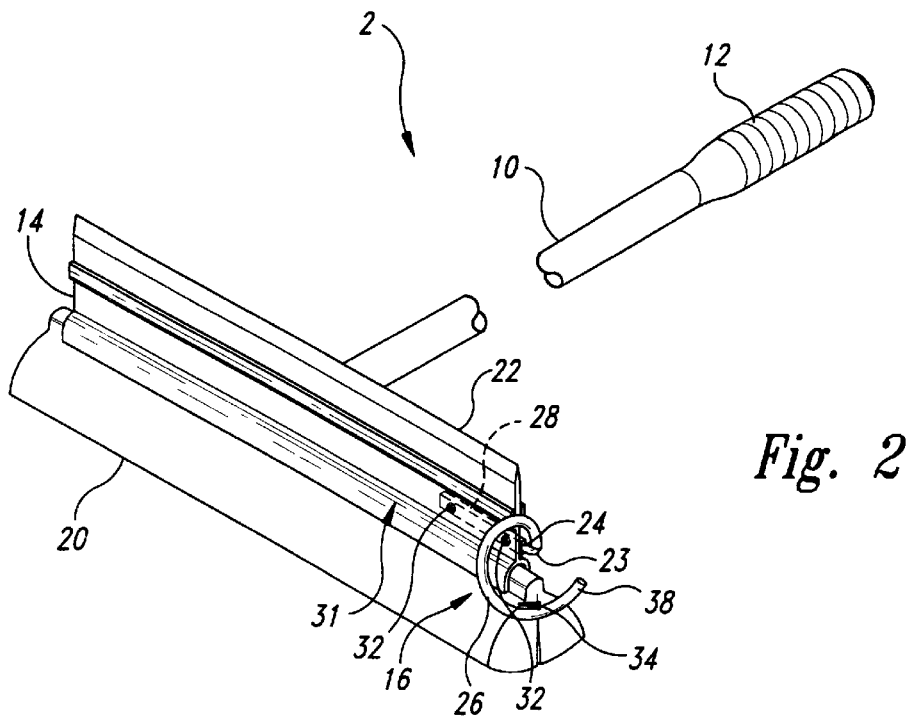
FIG. 2 is an end isometric view of the positioning tool of FIG. 1.

In one embodiment, the engaging member 16 comprises a substantially rigid rod 23 with a circular cross section as seen in FIG. 2. The rod includes an attachment portion 24 at one end, an engagement end 38 at an opposing end and an engagement portion 26 therebetween. The attachment portion 24 has a flattened region 28 which is fastened to an end portion 31 of the mounting bracket 14 to firmly support the engagement portion 26 relative to the mounting bracket.

Figure 3:
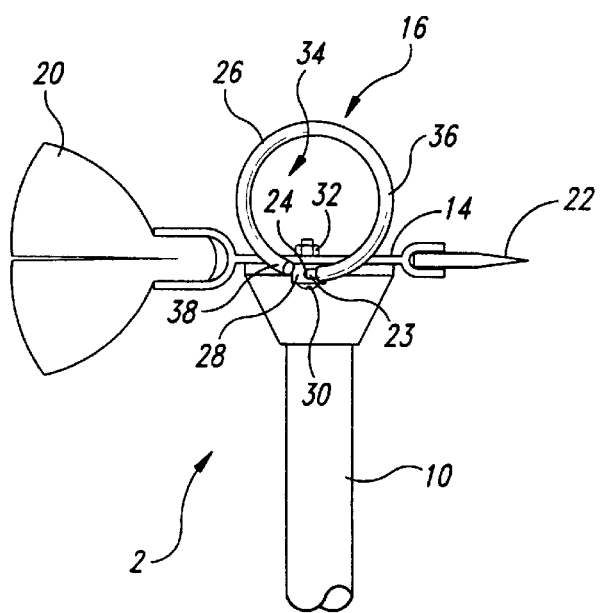
FIG. 3 is a side view of the positioning tool of FIG. 1.

In one embodiment, the engaging member 16 is fixedly attached to the mounting bracket 14, as shown in FIGS. 2 and 3. Bolts 30 pass through holes in the flattened region 28 and holes in the mounting bracket 14 to threadably engage nuts 32 in a conventional manner. In an alternate embodiment, the attachment portion 24 is fastened with rivets (not shown) to the mounting bracket 14. The rivets provide a simple means for permanently attaching the attachment portion 24 to the mounting bracket 14. In a further alternate embodiment, the attachment portion 24 is connected to the mounting bracket 14 with bolts 30 and wing nuts (not shown) to allow the engaging member 16 to be easily removed from the positioning tool 2 when the engaging member is not in use or if the engaging member must be replaced. In still further alternate embodiments, other means are used to fixedly or releasably attach the engaging member 16 to the mounting bracket 14.

The engagement portion 26 of the engaging member 16 extends away from the attachment portion 24 and is bent to define a retaining region 34 as is best seen in FIG. 3. In a preferred embodiment, the retaining region 34 is sized to accommodate at least a portion of the windshield wiper 4 to move the windshield wiper toward and away from the windshield 6 (FIG. 1). In one embodiment, the engagement portion 26 extends in an arcuate fashion to define a circular retaining region 34. In other embodiments, the engagement portion 26 defines retaining regions 34 having other shapes which also accommodate at least a portion of the windshield wiper 4.

The engagement portion 26 is preferably substantially rigid to provide the user 18 with firm control of the windshield wiper 4 when the tool 2 engages the wiper. In a preferred embodiment, the engagement portion 26 includes a protective coating 36 which covers the surface of the engagement portion. In one embodiment, the protective coating 36 is flexible and resilient to protect the windshield wiper 4 when it is engaged by the engagement portion 26. The protective coating 36 comprises a pliable plastic material in one embodiment and comprises other materials in other embodiments.

The engagement portion 26 terminates at the engagement end 38. The engagement end 38 preferably has a small cross-sectional area so that it may easily be inserted between the windshield wiper 4 and the windshield 6 (FIG. 1) as will be discussed in greater detail below. The engagement end 38 has a circular cross-sectional shape in the embodiment shown in FIGS. 1–3, and has other shapes in other embodiments.

Figure 4:
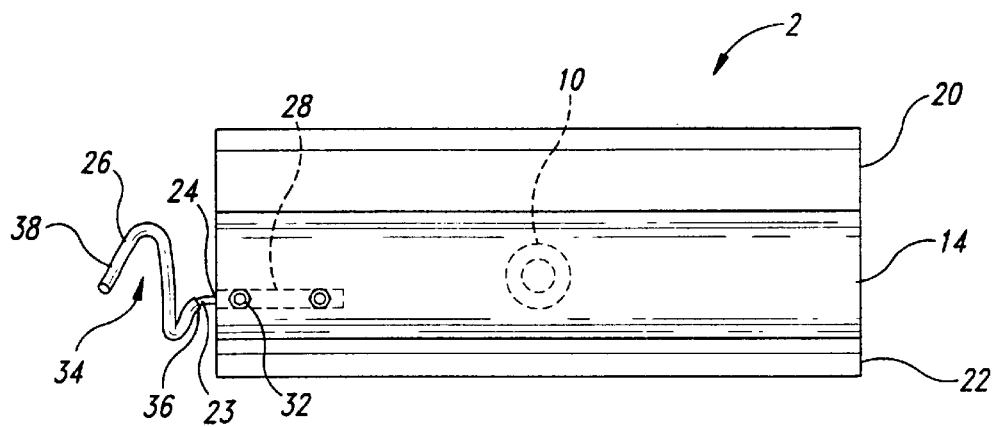
FIG. 4 is an end view of the positioning tool illustrated in FIG. 1.

The engagement end 38 is canted outward from the mounting bracket 14 as is best seen in FIG. 4, so that the engagement portion 26 has a spiral shape as it extends away from the attachment portion 24. The engagement end 38 is canted outward to make it easier for the user 18 to engage and retain the windshield wiper 4. The spiral shape allows the user to rotate the positioning tool 2 to partially thread the engagement portion 26 around the wiper blade 4. The wiper blade 4 may then be securely contained within the retaining region 34.

In a preferred embodiment, the engagement portion 26 extends through an angle of approximately 360° as is best seen in FIGS. 3 and 4. In alternate embodiments, the engagement portion extends through angles of greater or less than 360° while maintaining a spiral shape. In further alternate embodiments, the engagement portion has a planar, non-spiral shape, as will be discussed below with reference to FIGS. 5, 7, and 8.

In the embodiment shown in FIGS. 1–4, the positioning tool 2 includes the sponge 20 and squeegee blade 22 affixed to the mounting bracket 14. In alternate embodiments, other cleaning implements known in the art are attached to the positioning tool 2. In further alternate embodiments, the tool 2 includes no cleaning implements and the engaging member 16 may be attached directly to the handle 10. In still a further alternate embodiment, the engaging member 16 and handle 10 are of unitary construction with the handle 10 forming a handle portion of the tool 2.

Operation of the positioning tool 2 is best understood with reference to FIGS. 1 and 2. The user 18 stands on the ground beside the truck 8 holding the handgrip 12 of the handle 10. The user then positions the positioning tool 2 such that the engaging member 16 is adjacent the windshield wiper 4. In one embodiment, the user 18 inserts the engagement end 38 of the engaging member 16 into a gap 40 between the windshield 6 and a wiper arm 42 of the windshield wiper 4. In an alternate embodiment, the user inserts the engagement end 38 directly between the windshield 6 and a wiper blade 44 of the wiper 4.

Once the user has engaged the engagement end 38 with the windshield wiper 4, he pivots the positioning tool 2 slightly by moving the handle 10 upward to position the wiper arm 42 within the retaining region 34, effectively threading the engagement portion 26 around the wiper arm. The user then moves the positioning tool 2 away from the windshield 6. As the user 18 moves the positioning tool 2, the engaging member 16 engages the wiper arm 42 and moves it away from the windshield. As the wiper arm 42 moves away from the windshield 6, a spring 46, which normally biases the wiper arm 42 toward the windshield 6, may cause the wiper arm to tend to rapidly pivot away from the windshield. The positioning tool 2 retains the wiper arm 42 in the retaining region 34 thereby preventing uncontrolled motion of the windshield wiper as the user 18 moves the windshield wiper away from the windshield 6.

Once the windshield wiper 4 has been positioned away from the windshield 6, the user 18 disengages the engagement portion 26 from the wiper arm 42 by pivoting the handle 10 slightly downward. The user 18 may then clean the windshield 6 with the sponge 20 and squeegee blade 22. To reposition the windshield wiper 4 against the windshield 6, the user 18 engages the windshield wiper 4 with the positioning tool 2 as discussed above, moves the positioning tool toward the windshield 6, and disengages the tool, as discussed above.

One advantage of an embodiment of the positioning tool 2 of the present invention is that it allows the user 18 to remain on the ground beside the truck 8 while positioning the windshield wiper 4. As a result, the user 18 need not climb onto the truck 8 to position the windshield wipers 4. Another advantage of the present invention is that the positioning tool 2 includes an engaging member 16, a sponge 20, and squeegee blade 22. Accordingly, a single tool 2 may be used to move the windshield wiper 4 away from the windshield 6 prior to cleaning, clean the windshield, and reposition the windshield wiper against the windshield.

Yet another advantage of an embodiment of the positioning tool 2 of the present invention is that the simple construction of the engaging member 16 makes it relatively inexpensive to manufacture. The simple construction also allows the engaging member 16 to be easily retrofitted to existing windshield cleaning tools.

A further advantage of an embodiment of the positioning tool 2 is that the spiral shape of the engaging member 16 limits movement of the windshield wiper 4 as the windshield wiper is being repositioned, thereby reducing the likelihood that the spring 46 biasing the windshield wiper 4 will cause the windshield wiper to move in an uncontrolled fashion. Another advantage of the spiral shape of the engaging member 16 is that it allows the positioning tool 2 to be easily stored by hanging the engaging member 16 of the positioning tool from a hook or other such projection when the positioning tool is not in use.

Figure 5:
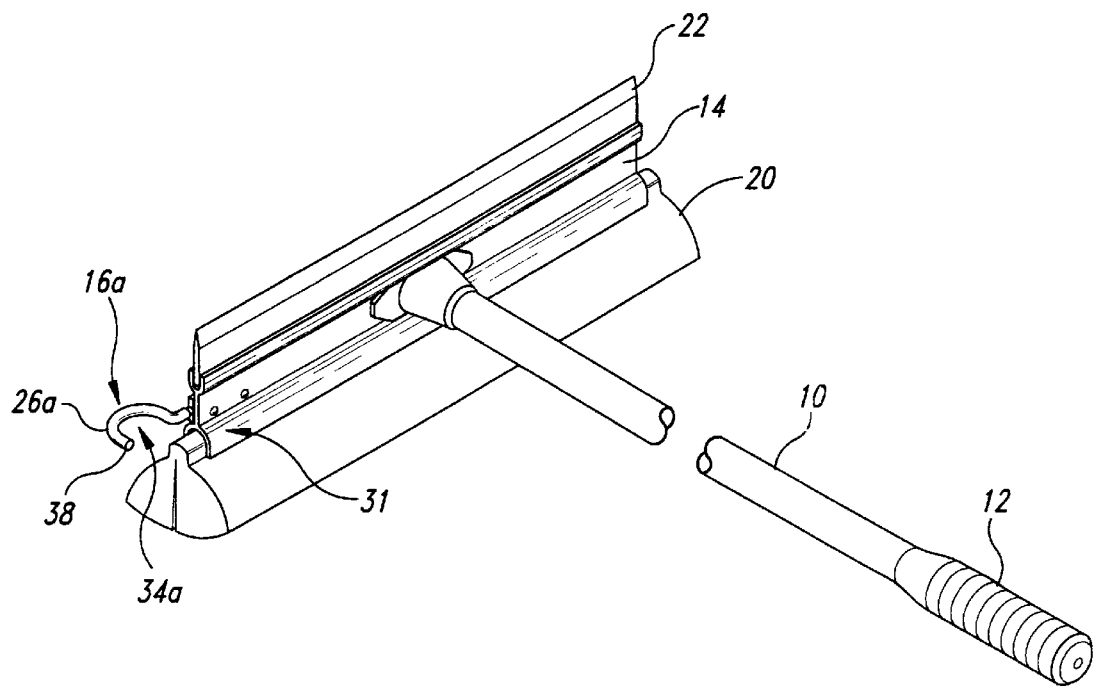
FIG. 5 is an isometric view of a second embodiment of a positioning tool in accordance with the present invention.

FIG. 5 is an isometric view of a second embodiment of the positioning tool 2 having a hook-shaped engaging member 16a. The engaging member 16a includes an arcuate engagement portion 26a which defines an open-ended retaining region 34a. In one embodiment, the engagement portion 26a has a single, continuous bend of approximately 180° so that the engagement end 38 extends parallel to the handle 10 and is substantially coplanar with the engagement portion 26a. In other embodiments, the engagement portion 26a has bends of more or less than 180° so long as the retaining region 34a is sufficiently open to allow the windshield wiper 4 or a portion thereof to pass into the retaining region, and is sufficiently closed to substantially prevent the windshield wiper from inadvertently slipping out of engagement with the engagement portion 26a. In further alternate embodiments, the engagement portion 26a may include a plurality of discrete bends to define the retaining region 34a. The bends may be arcuate, as shown in the figures, or may be a series of sharp, angular bends (not shown). The engaging member 16a may be attached to the end portion 31 of the mounting bracket 14 in any of the manners discussed previously with reference to FIGS. 1–4.

The positioning tool 2 shown in FIG. 5 is operated in a manner similar to that discussed previously with reference to FIG. 1. The user 18 preferably engages the engagement portion 26a of the engaging member 16a by inserting the engagement end 38 into the gap 40 between the wiper arm 42 and the windshield 6 (FIG. 1). Alternatively, the user 18 may insert the engagement end 38 directly between the wiper blade 44 and the windshield 6. In the preferred method of operation, the user 18 then moves the positioning tool 2 away from the windshield 6 to place the wiper arm 42 within the retaining region 34a. Because the engagement portion 26a is not spirally shaped, the user 18 need not pivot the positioning tool 2 to position the wiper arm 42 within the retaining region 34a. Once the wiper arm 42 is within the engaging region 34a, the user 18 may move the wiper 4 toward or away from the windshield 6, as discussed previously with reference to FIG. 1.

An advantage of the embodiment of the positioning tool 2 shown in FIG. 5 when compared with the embodiment shown in FIGS. 1–4 is that the engaging member 16a is simpler and less costly to manufacture by virtue of its simple hook shape. Conversely, an advantage of the embodiment of the positioning tool 2 shown in FIGS. 1–4 is that the engaging member 16 may more securely retain the wiper arm 42 as a result of the spiral shape of the engagement portion 26.

Figure 6:
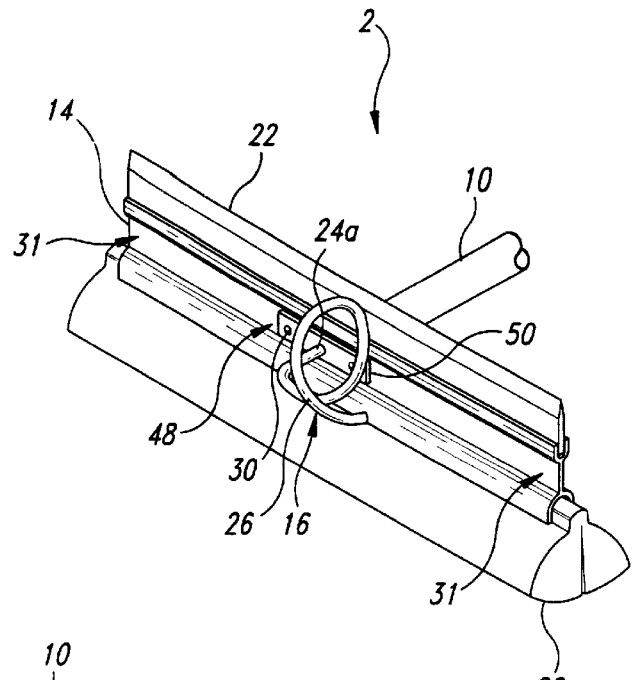
FIG. 6 is an end isometric view of a third embodiment of a positioning tool in accordance with the invention.

FIG. 6 is an isometric view of a third embodiment of the positioning tool 2 in which the engaging member 16 is attached to a central portion 48 of the mounting bracket 14. The central portion 48 is positioned intermediate the end portions 31. An attachment portion 24a is attached to a mounting plate 50 which is in turn attached to the central portion 48, with bolts 30 and nuts (not shown). In other embodiments, other attachment means, such as those discussed previously with reference to FIG. 2 are used to attach the mounting plate 50 to the mounting bracket 14. In a further alternate embodiment, the attachment portion 24a is connected directly the mounting bracket 14 without the mounting plate 50.

The attachment portion 24a is coupled to the mounting bracket 14 in such a way that it is substantially aligned with the major axis of the handle 10. The attachment portion 24a extends a sufficient distance away from the mounting bracket 14 so that the mounting bracket, sponge 20 and squeegee blade 22 do not interfere with the windshield 6 or windshield wiper 4 as the user 18 engages the tool 2 with the windshield wiper (FIG. 1). In the embodiment shown in FIG. 6, the positioning tool 2 includes spiral-shaped engagement portion 26. In alternate embodiments, the tool 2 includes a hook-shaped engagement portion 26a, such as is shown in FIG. 5 or engagement portions with other shapes.

The positioning tool 2 shown in FIG. 6 is operated in substantially the same manner as discussed previously with reference to FIG. 1. An advantage of the positioning tool 2 shown in FIG. 6 when compared with the tool shown in FIGS. 1–5 is that when the user 18 moves the handle of the tool shown in FIG. 6 to position the windshield wiper 4 away from the windshield 6, the tool has a reduced tendency to twist or pivot within the user's grasp because the engagement member 16 is aligned with the handle 10. Accordingly, the user is less likely to lose control of the positioning tool 2 while positioning the wiper blade 4. Conversely, it may be easier to position the engaging member 16 shown in FIGS. 1–5 relative to the windshield wiper 4 because the engagement portion 26 projects outwardly from the end portion 31 of the mounting bracket 14. The user 18 may also have an improved visibility of the windshield wiper 4 and engaging member 16 when the engaging member projects outwardly from the end portion 31 of the mounting bracket 14.

Figure 7:
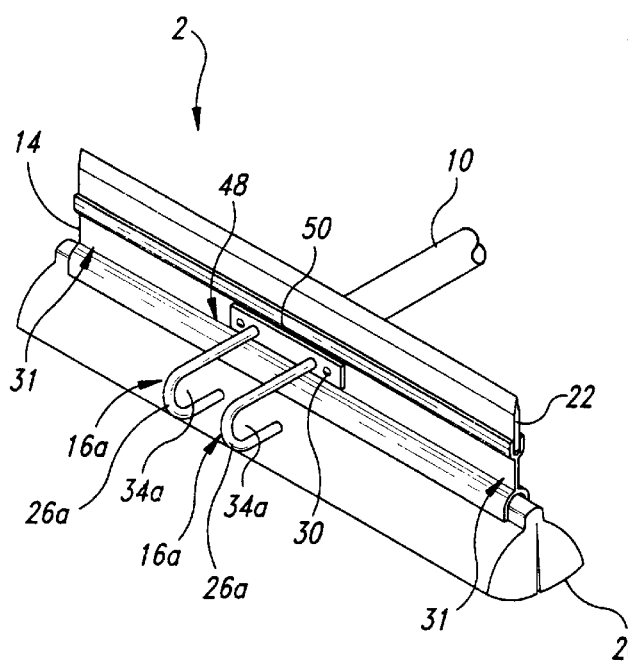
FIG. 7 is an end isometric view of a fourth embodiment of a positioning tool in accordance with the present invention.

FIG. 7 is an isometric view of a positioning tool 2 in accordance with a fourth embodiment of the present invention having two engaging members 16a attached to the central portion 48 of the mounting bracket 14. In the embodiment shown in FIG. 7, the engaging members 16a are spaced sufficiently close together that the user may easily engage both engaging members with the windshield wiper 4 in a single operation (FIG. 1). In another embodiment, the engaging members 16a are spaced sufficiently far apart that the user 18 may engage either one or both engaging members with the windshield wiper 4. In yet another embodiment, the engaging members 16a are attached to an end portion 31 of the mounting bracket 14. Accordingly, the user 18 may easily engage either one or the other of the engaging members 16a with the windshield wiper 4. In this way, the positioning tool 2 may be more easily used to engage a windshield wiper 4 from either the left or right side of the truck 8 (FIG. 1).

As shown in FIG. 7, the engaging members 16a have substantially planar engagement portions 26a, as discussed previously with reference to FIG. 5. In alternate embodiments, engaging members 16 having spiral-shaped engagement portions as shown in FIGS. 1–4, or engagement portions of other shapes are substituted for the engaging member 1 6a. In further alternate embodiments, more than two engaging members are attached to the mounting bracket 14. The engaging members 16a may be fixedly or removably attached to the mounting bracket, as discussed previously with reference to FIG. 2.

Operation of an embodiment of the positioning tool 2 shown in FIG. 7 is substantially similar to the operation of the positioning tool shown in FIG. 5. An advantage of an embodiment of the positioning tool 2 shown in FIG. 7 is that the plurality of engaging members 16a more uniformly distributes the load placed on the windshield wiper 4 when the engaging members engage the windshield wiper, therefore reducing the likelihood that the windshield wiper will bend or be otherwise damaged when positioned with the positioning tool 2. A further advantage of an embodiment of the positioning tool 2 shown in FIG. 7 is that the user may more easily engage the positioning tool 2 with the windshield wiper 4 when a plurality of engaging members 16a are available. Thus, if the user 18 misses engaging one of the engaging members 16a with the wiper 4, another engaging member is readily available to engage the wiper without requiring the user to move the positioning tool a substantial distance. Yet a further advantage of an embodiment shown in FIG. 7 is that the plurality of engaging members 16a provides greater assurance that the windshield wiper 4 will remain within one of the retaining regions 34a when the wiper is moved relative to the windshield 6. Accordingly, if both the engaging members 16a are initially engaged with the windshield wiper 4 and one of the engaging members 16a slips out of engagement with the windshield wiper, the remaining engaging member maintains contact with the windshield wiper to allow the user to position the wiper without having to re-engage the tool 2 with the wiper.

Figure 8:
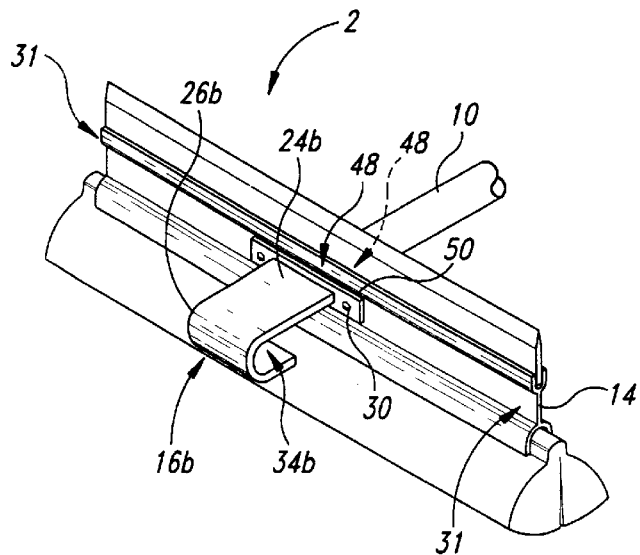
FIG. 8 is an end isometric view of a fifth embodiment of a positioning tool in accordance with the present invention.

FIG. 8 is an isometric view of a fifth embodiment of the positioning tool 2 in accordance with the invention having an engaging member 16b with an elongated, rectangular cross-sectional shape. The rectangular cross-sectional shape provides an engagement portion 26b with a relatively large amount of surface area with which to engage the windshield wiper 4 (FIG. 1). The engagement portion 26b defines an open-ended retaining region 34b for retaining the windshield wiper 4. The engaging member 16b further includes an attachment portion 24b connected to the mounting plate 50 which may be fixedly or removably attached to the mounting bracket 14, as discussed previously with reference to FIGS. 2 and 6. Although the engaging member 16b is shown attached to the central portion 48 of the mounting bracket 14, in alternate embodiments the engaging member 16b is attached to the end portion 31 or other portions of the mounting bracket. Operation of the positioning tool 2 shown in FIG. 8 is substantially similar to operation of the positioning tool discussed with reference to FIG. 5.

An advantage of the embodiment of the positioning tool 2 shown in FIG. 8 is that the relatively large surface area of the engagement portion 26b reduces the load placed on any one portion of the windshield wiper 4 as the engaging member 16b engages the windshield wiper and moves it relative to the windshield 6. Accordingly, the likelihood that the windshield wiper 4 may be bent or otherwise damaged as it is moved is reduced.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A tool for moving a windshield wiper positioned proximate to a windshield of a vehicle, the tool comprising:

a handle elongated along a handle axis between a first end and a second end and adapted to be grasped by a user toward the first end;

a cleaning device attached toward the second end of the handle; and a generally rigid engaging hook having a first end positionable between the windshield wiper and the windshield, a second end opposite the first, and an engagement portion between the first and second ends, the engagement portion being at least partially wound about a longitudinal axis extending away from the second end to form an at least partially spiral shape, the engagement portion having a bend therein and extending at least partially around a retaining region, the engagement portion adapted to engage a portion of the windshield wiper and move the windshield wiper toward the windshield when the engaging hook is moved toward the windshield and away from the windshield when the engaging hook is moved away from the windshield, the retaining region retaining the portion of the windshield wiper therein when the engagement portion engages the portion of the windshield wiper, the engaging hook being coupled toward the second end to one of the cleaning device and the handle.

2. The tool of claim 1 wherein the engaging hook has an elongated rectangular cross-sectional shape.

3. The tool of claim 1 wherein the engaging hook comprises a rod elongated along an axis extending between the first and second ends of the engaging hook.

4. The tool of claim 3 wherein the rod has a circular cross-sectional shape.

5. The tool of claim 1 wherein the engagement portion of the engaging hook is at least partially wound about an axis extending transverse to the handle axis.

6. The tool of claim 1 wherein the first end of the engaging hook is longitudinally offset from the second end of the engaging hook and the engaging hook is at least partially wound about a longitudinal axis extending away from the second end thereof.

7. The tool of claim 1 wherein the engaging hook is a first engaging hook capable of engaging a first portion of the windshield wiper, further comprising a second engaging hook having a first end positionable between the windshield wiper and the windshield, a second end opposite the first, and an engagement portion between the first and second ends, the engagement portion of the second engaging hook having at least one bend therein extending at least partially around a retaining region, the engagement portion of the second engaging hook adapted to engage a second portion of the windshield wiper and move the windshield wiper toward the windshield when the second engaging hook is moved toward the windshield and away from the windshield when the second engaging hook is moved away from the windshield, the retaining region of the second engaging hook retaining the second portion of the windshield wiper therein when the engagement portion of the second engaging hook engages the second portion of the windshield wiper, the second engaging hook being configured to be coupled toward the second end to one of the cleaning device and the handle.

8. The tool of claim 1 wherein the bend comprises a continuous arcuate bend of approximately 180 degrees.

9. The tool of claim 1 wherein the bend has an angle of greater than 180 degrees.

10. The tool of claim 1 wherein the windshield wiper has wiper arm spaced apart from the windshield to define a gap therebetween and the first end of the engaging hook is sized and shaped to fit within the gap.

11. The tool of claim 1 wherein the wiper includes a wiper arm spaced apart from the windshield and a wiper blade positioned adjacent the windshield, the first end of the engaging hook having a cross-sectional size sufficiently small to be interposed between the wiper blade and the windshield.

12. The tool of claim 1 wherein the handle has a length sufficient to allow a user to stand on the ground adjacent the vehicle and engage the engaging hook with the windshield wiper.

13. The tool of claim 1 wherein the cleaning device has first and second opposing ends and an intermediate portion therebetween, the engaging hook being connected toward the first end of the cleaning device.

14. The tool of claim 1 wherein the cleaning device has first and second opposing ends and an intermediate portion therebetween, the engaging hook being connected to the intermediate portion of the cleaning device.

15. The tool of claim 1 wherein the cleaning device has first and second opposing ends and an intermediate portion therebetween, the intermediate portion of the cleaning device being attached to the handle.

16. The tool of claim 1 wherein the cleaning tool comprises a sponge.

17. The tool of claim 1 wherein the cleaning tool comprises a flexible blade having an edge configured to engage the windshield and remove liquid therefrom when the blade is in contact with the windshield and moved relative thereto.

18. The tool of claim 1 wherein the engaging hook has a protective layer covering at least part of the engagement portion, the protective layer being interposed between the engagement portion and the windshield wiper to protect the windshield wiper when the engaging hook engages the windshield wiper.

19. The tool of claim 18 wherein the protective layer comprises a flexible, resilient material to cushion the windshield wiper when the engaging hook engages the windshield wiper.

20. The tool of claim 1 wherein the engaging hook is removably coupled to the handle.

21. A tool for positioning a windshield wiper of a vehicle, the windshield wiper being movable relative to a windshield of the vehicle, the tool comprising a generally rigid engaging member having a generally blunt first end positionable between the windshield wiper and the windshield, a second end opposite the first, and an engagement portion between the first and second ends, the engagement portion being at least partially wound about a longitudinal axis extending away from the second end to form an at least partially spiral shape the engagement portion extending at least partially around a retaining region and adapted to engage a portion of the windshield wiper and move the windshield wiper toward the windshield when the engaging member is moved toward the windshield and away from the windshield when the engaging member is moved away from the windshield, the retaining region retaining the windshield wiper portion therein when the engagement portion engages the windshield wiper portion, the engaging member being configured to be coupled to a handle toward the second end.

22. The tool of claim 21, further comprising a handle having first and second opposite ends, the handle being configured to be gripped by a user's hand toward the first end and coupled toward the second end to the second portion of the engaging member.

23. The tool of claim 22 wherein the second end of the handle is a sufficient distance away from the first end of the handle that the user may grip the handle toward the first end and engage the engaging member with the windshield wiper and while the user is standing on the ground beside the vehicle.

24. The tool of claim 21 wherein the engaging member has an elongated rectangular cross-sectional shape.

25. The tool of claim 21 wherein the engaging member comprises an elongated rod.

26. The tool of claim 21 wherein the engaging member is removably coupleable to the handle.

27. A method for moving a windshield wiper positioned proximate to a windshield of a vehicle, the method comprising:
grasping a positioning tool having an engaging member with at least one bend therein extending at least partially around a retaining region;
passing an end of the engaging member between a portion of the windshield wiper and the windshield;
engaging the engaging member with the windshield wiper;
positioning the engaging member such that the windshield wiper portion is at least partially within the retaining region; and
moving the engaging member relative to the windshield to move the windshield wiper relative to the windshield.

28. The method of claim 27, further comprising the step of disengaging the engaging member and the windshield wiper when the windshield wiper is at a selected position relative to the windshield.

29. The method of claim 27, further comprising the step of rotating the engaging member to thread the engaging member about the windshield wiper.

30. A tool for moving a windshield wiper positioned proximate to a windshield of a vehicle, the tool comprising:
a handle elongated along a handle axis between a first end and a second end and adapted to be grasped by a user toward the first end;
a cleaning device attached toward the second end of the handle;
a generally rigid first engaging hook having a first end positionable between the windshield wiper and the windshield, a second end opposite the first, and an engagement portion between the first and second ends, the engagement portion having a bend therein and extending at least partially around a retaining region, the engagement portion adapted to engage a portion of the windshield wiper and move the windshield wiper toward the windshield when the first engaging hook is moved toward the windshield and away from the windshield when the first engaging hook is moved away from the windshield, the retaining region retaining the portion of the windshield wiper therein when the engagement portion engages the portion of the windshield wiper, the first engaging hook being coupled toward the second end to one of the cleaning device and the handle; and
a second engaging hook having a first end positionable between the windshield wiper and the windshield, a second end opposite the first, and an engagement portion between the first and second ends, the engagement portion of the second engaging hook having at least one bend therein extending at least partially around a retaining region, the engagement portion of the second engaging hook adapted to engage a second portion of the windshield wiper and move the windshield wiper toward the windshield when the second engaging hook is moved toward the windshield and away from the windshield when the second engaging hook is moved away from the windshield, the retaining region of the second engaging hook retaining the second portion of the windshield wiper therein when the engagement portion of the second engaging hook engages the second portion of the windshield wiper, the second engaging hook being configured to be coupled toward the second end to one of the cleaning device and the handle.

31. A tool for moving a windshield wiper positioned proximate to a windshield of a vehicle, the tool comprising:
a handle elongated along a handle axis between a first end and a second end and adapted to be grasped by a user toward the first end;
a cleaning device having first and second opposing ends and being attached to the handle toward the second end of the handle; and
a generally rigid engaging hook having a first end positionable between the windshield wiper and the windshield, a second end opposite the first, and an engagement portion between the first and second ends, the engagement portion having a bend therein and extending at least partially around a retaining region, the engagement portion adapted to engage a portion of the windshield wiper and move the windshield wiper toward the windshield when the engaging hook is moved toward the windshield and away from the windshield when the engaging hook is moved away from the windshield, the retaining region retaining the portion of the windshield wiper therein when the engagement portion engages the portion of the windshield wiper, the engaging hook being coupled toward the first end of the cleaning device.

32. A tool for moving a windshield wiper positioned proximate to a windshield of a vehicle, the tool comprising:

a handle elongated along a handle axis between a first end and a second end and adapted to be grasped by a user toward the first end;

a cleaning device attached toward the second end of the handle having an at least partially flexible cleaning surface for cleaning the windshield;

a generally rigid engaging hook having a first end offset from the handle axis and positionable between the windshield wiper and the windshield, a second end opposite the first, and an engagement portion between the first and second ends, the first end of the engaging hook being longitudinally offset from the second end of the engaging hook and the engaging hook being at least partially wound about a longitudinal axis extending away from the second end of the engaging hook, the engagement portion having a bend therein and extending at least partially around a retaining region, the engagement portion adapted to engage a portion of the windshield wiper and move the windshield wiper toward the windshield when the engaging hook is moved toward the windshield and away from the windshield when the engaging hook is moved away from the windshield, the retaining region retaining the portion of the windshield wiper therein when the engagement portion engages the portion of the windshield wiper, the engaging hook being coupled toward the second end to one of the cleaning device and the handle; and a protective layer covering at least part of the engagement portion, the protective layer being interposed between the engagement portion and the windshield wiper to protect the windshield wiper when the engaging hook engages the windshield wiper.

33. The tool of claim 32 wherein the protective layer comprises a flexible, resilient material to cushion the windshield wiper when the engaging hook engages the windshield wiper.

34. A tool for moving a windshield wiper positioned proximate to a windshield of a vehicle, the tool comprising:

a handle elongated along a handle axis between a first end and a second end and adapted to be grasped by a user toward the first end;

a cleaning device attached toward the second end of the handle, the cleaning device having an at least partially flexible cleaning surface for cleaning the windshield; and a generally rigid engaging hook having a first end positionable between the windshield wiper and the windshield, a second end opposite the first, and an engagement portion between the first and second ends, the first end of the engaging hook being longitudinally offset from the second end of the engaging hook, the engagement portion having a bend therein and extending at least partially around a retaining region, the engagement portion adapted to engage a portion of the windshield wiper and move the windshield wiper toward the windshield when the engaging hook is moved toward the windshield and away from the windshield when the engaging hook is moved away from the windshield, the retaining region retaining the portion of the windshield wiper therein when the engagement portion engages the portion of the windshield wiper, the engaging hook being coupled toward the second end to the cleaning device.

35. The tool of claim 34 wherein the first end of the engaging hook is at least partially wound about a longitudinal axis extending away from the second end thereof.

* * * * *